United States Patent
Dong

(10) Patent No.: US 10,108,323 B2
(45) Date of Patent: Oct. 23, 2018

(54) METHOD AND DEVICE FOR DRAWING A GRAPHICAL USER INTERFACE

(71) Applicant: Xiaomi Inc., Beijing (CN)

(72) Inventor: Junjie Dong, Beijing (CN)

(73) Assignee: Xiaomi Inc., Beijing (CN)

( * ) Notice: Subject to any disclaimer, the term of this patent is extended or adjusted under 35 U.S.C. 154(b) by 65 days.

(21) Appl. No.: 15/209,822

(22) Filed: Jul. 14, 2016

(65) Prior Publication Data

US 2017/0139574 A1     May 18, 2017

(30) Foreign Application Priority Data

Nov. 12, 2015    (CN) .......................... 2015 1 0770907

(51) Int. Cl.
     *G06F 3/0484*      (2013.01)
     *G06T 3/40*      (2006.01)

(52) U.S. Cl.
     CPC ............ *G06F 3/04845* (2013.01); *G06T 3/40* (2013.01)

(58) Field of Classification Search
     CPC .............................. G06F 3/04845; G06T 3/40
     USPC ......................................................... 345/661
     See application file for complete search history.

(56) References Cited

U.S. PATENT DOCUMENTS

| | | | |
|---|---|---|---|
| 7,614,003 B2 | 11/2009 | Brichford et al. | |
| 8,627,216 B2 | 1/2014 | Brichford et al. | |
| 2002/0054136 A1* | 5/2002 | Andrew | G06F 3/0481 715/800 |
| 2003/0160821 A1 | 8/2003 | Yoon | |
| 2005/0233287 A1* | 10/2005 | Bulatov | G09B 21/006 434/114 |
| 2007/0198915 A1* | 8/2007 | Hiyama | G06F 17/212 715/234 |
| 2008/0098296 A1 | 4/2008 | Brichford et al. | |
| 2008/0209442 A1 | 8/2008 | Setlur et al. | |
| 2010/0023884 A1 | 1/2010 | Brichford et al. | |
| 2013/0321257 A1 | 12/2013 | Moore et al. | |
| 2013/0321392 A1 | 12/2013 | Van Der Merwe et al. | |
| 2015/0370445 A1* | 12/2015 | Wang | G06F 17/30896 715/765 |

FOREIGN PATENT DOCUMENTS

| | | | |
|---|---|---|---|
| CN | 101553771 A | 10/2009 | |
| CN | 103019682 A | 4/2013 | |

(Continued)

OTHER PUBLICATIONS

International Search Report of PCT/CN2015/099733, mailed from the State Intellectual Property Office of China dated Jul. 26, 2016.

(Continued)

*Primary Examiner* — Ke Xiao
*Assistant Examiner* — Kim-Thanh T Tran
(74) *Attorney, Agent, or Firm* — Finnegan, Henderson, Farabow, Garrett & Dunner LLP

(57) ABSTRACT

A method for drawing a graphical user interface (GUI) is disclosed. The method may be implemented by a terminal. The method may comprise receiving an instruction for drawing a GUI; determining attribute data of each of graphic elements in a scalable vector graphic (SVG) document according to the received instruction, the graphic elements corresponding to the GUI; and drawing the GUI according to the determined attribute data.

20 Claims, 9 Drawing Sheets

(56) References Cited

FOREIGN PATENT DOCUMENTS

| | | |
|---|---|---|
| CN | 103049164 A | 4/2013 |
| CN | 103226471 A | 7/2013 |
| CN | 103425477 A | 12/2013 |
| CN | 103970896 A | 8/2014 |
| CN | 104572967 A | 4/2015 |
| CN | 104699483 A | 6/2015 |
| JP | 2005-135383 A | 5/2005 |
| JP | 2006-99400 A | 4/2006 |
| JP | 2009-176042 A | 8/2009 |
| KR | 10-2003-0070685 A | 9/2003 |
| KR | 10-2008-0037089 A | 4/2008 |
| RU | 2371758 C2 | 10/2009 |
| RU | 2541125 C2 | 2/2015 |
| WO | WO 2013/049162 A1 | 4/2013 |

OTHER PUBLICATIONS

Extended European Search Report issued in European Patent Application No. 16170923.3, from the European Patent Office, dated Mar. 24, 2017.
English version of International Search Report of PCT/CN2015/099733, mailed from the State Intellectual Property Office of China dated Jul. 26, 2016.
"Internet Explorer 10 & HTML5 Web Application Development Book", dated Jan. 31, 2013, 1st Ed., pp. 151-169.
"Practice! SVG 3rd: Dynamically Change SVG Display with DOM + JavaScript!", dated Nov. 20, 2002, URL: http://www.utj.co.jp/xml/dev/svg/svg_3.html (retrieved on Mar. 29, 2018).

* cited by examiner

METHOD AND DEVICE FOR DRAWING A GRAPHICAL USER INTERFACE

CROSS-REFERENCE TO RELATED APPLICATIONS

The present application is based upon and claims priority to Chinese Patent Application No. 201510770907.0, filed Nov. 12, 2015, the entire contents of which are incorporated herein by reference.

TECHNICAL FIELD

The present disclosure generally relates to the field of communication technology, and more particularly, to a method and a device for drawing a graphical user interface.

BACKGROUND

A Graphical User Interface (GUI) is a user operation interface displayed in a graphic form. The GUI can be drawn in a format of Portable Network Graphics (PNG). PNG is a type of bitmap pictures and stored as a system resource. In compiling these resources, each picture is assigned with a resource ID. A resource can be directly accessed with its ID. However, drawing such a GUI using bitmap pictures may consume significant memory space.

SUMMARY

One aspect of the present disclosure is directed to a method for drawing a graphical user interface (GUI). The method may be implemented by a terminal. The method may comprise receiving an instruction for drawing a GUI; determining attribute data of each of graphic elements in a scalable vector graphic (SVG) document according to the received instruction, the graphic elements corresponding to the GUI; and drawing the GUI according to the determined attribute data.

Another aspect of the present disclosure is directed to a device for drawing a graphical user interface (GUI). The device may comprise a processor and a memory for storing instructions executable by the processor. The processor may be configured to perform: receiving an instruction for drawing a GUI; determining attribute data of each of graphic elements in a scalable vector graphic (SVG) document according to the received instruction, the graphic elements corresponding to the GUI; and drawing the GUI according to the determined attribute data.

Another aspect of the present disclosure is directed to a non-transitory computer-readable storage medium having stored instructions that, when executed by a processor of a terminal, cause the terminal to perform a method for drawing a graphical user interface (GUI). The method may comprise receiving an instruction for drawing a GUI; determining attribute data of each of graphic elements in a scalable vector graphic (SVG) document according to the received instruction, the graphic elements corresponding to the GUI; and drawing the GUI according to the determined attribute data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of devices and methods consistent with aspects related to the invention as recited in the appended claims.

The terms used herein are merely for describing a particular embodiment, rather than limiting the present disclosure. As used in the present disclosure and the appended claims, terms in singular forms such as "a," "said," and "the" are intended to also include plural forms, unless explicitly dictated otherwise. It should also be understood that the term "and/or" used herein means any one or any possible combination of one or more associated listed items.

It should be understood that, although it may describe an element with a term first, second, or third, etc., the element is not limited by these terms. These terms are merely for distinguishing among elements of the same kind. For example, without departing from the scope of the present disclosure, a first element can also be referred to as a second element. Similarly, a second element can also be referred to as a first element. Depending on the context, a term "if" as used herein can be interpreted as "when," "where," or "in response to".

Figure 1:
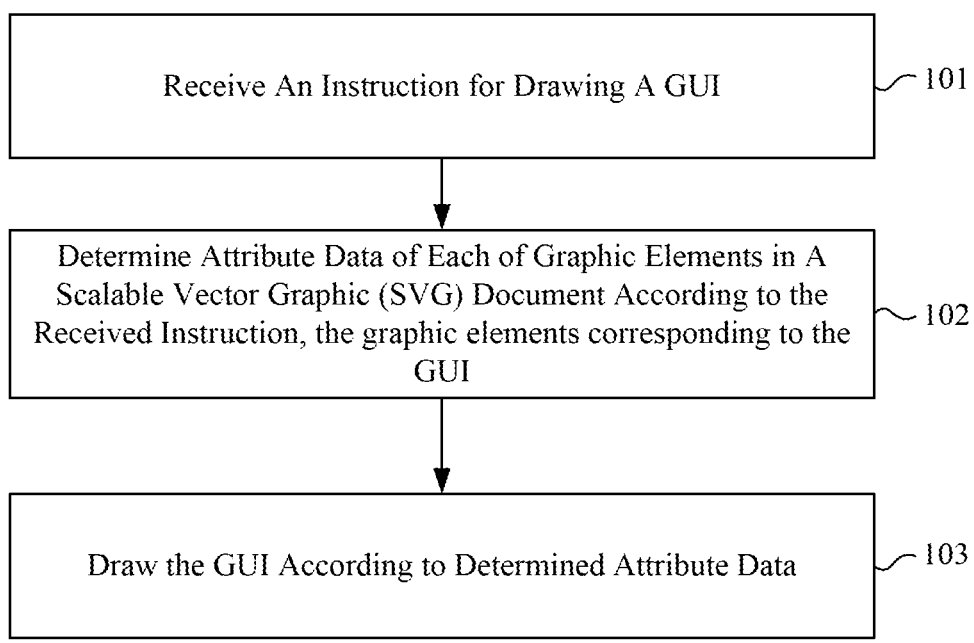
FIG. 1 is a flow chart illustrating a method for drawing a graphical user interface, according to an exemplary embodiment of the present disclosure.

FIG. 1 is a flow chart illustrating a method 100 for drawing a graphical user interface, according to an exemplary embodiment of the present disclosure. As shown in FIG. 1, the method 100 can be implemented by a terminal, and may include the following steps.

In step 101, an instruction for drawing a GUI is received.

In step 102, attribute data of each of graphic elements in a scalable vector graphic (SVG) document is determined according to the received instruction, the graphic elements corresponding to the GUI.

In step 103, the GUI is drawn according to the determined attribute data.

In one embodiment, the terminal can be a smart terminal, such as a smart phone, a tablet computer, a Personal Digital Assistant (PDA), an e-book reader, a multimedia player, and the like.

Scalable Vector Graphics (SVG) is a graphic format based on Extensible Markup Language (XML), for describing two-dimensional vector graphics. SVG specification can define features, syntax, and display effects of SVG, and include modular XML namespace (namespace) and a Document Object Model (DOM). SVG can be drawn by a dynamic and interacting method, e.g., an embedded method or a script. SVG can provide hyperlinks, and define various events. Since SVG supports scrip language, responding to a particular event can be done by programmed with script to access SVG DOM elements and attributes, thereby improving dynamic and interacting performance of SVG.

In a GUI based on SVG, the interface can contain a window. A window can contain interface elements each of which containing SVG. A SVG document can contain various graphic elements and other elements. A graphic element can be a rectangle, an oval, a line section, a path, and the like. A graphic element can contain a tag and/or contents of the tag. The graphic elements may constitute main components of the SVG document. Data of the SVG document may be contained in the graphic elements and the attributes. Information about a graphic element can be described with an attribute as "Name=Value." An attribute may be a part of a graphic element.

In some embodiments, a GUI can be described with a SVG document. The drawing of a GUI may imply drawing in a broad sense, and may include parsing and rendering of a SVG document. A topological structure of GUI can be an inverted tree, with a root node being an interface window, branch nodes being interface elements, and nodes below the interface elements being SVG graphic elements. Therefore, drawing can be performed level by level. For example, a window sends a drawing task to SVG, the SVG divides the drawing task and distributes to each of graphic elements, and the drawing is completed by the graphic elements. Then, the window sends the drawing to a first interface element, and the interface element sends the drawing task to the SVG for the SVG to perform the drawing. The process is continued based on this principle until the drawing of the whole interface is completed.

In step 101, the instruction can be an instruction for drawing a GUI. When the instruction is received, the GUI can be redrawn. The instruction can be a scaling instruction for a window, a style changing instruction for a GUI, a state switching instruction for an interface element, etc.

In step 102, when the instruction for drawing the GUI is received, a SVG document can be parsed according to the instruction, and attribute data corresponding to each of graphic elements in the SVG document can be determined according to the parsed data and the instruction. The attribute data can include an attribute name and a corresponding attribute value. Since SVG is based on XML, parsing the SVG document can be performed through a Document Object Model (DOM), a Simple API for XML (SAX) or a XML Pull Parser (XPP), etc. For example, in DOM, a SVG document can be represented as a DOM tree composed of node objects with a root of the tree being a Document object which represents a whole reasonable SVG document. In this parsing method, the whole SVG document can be required to be parsed as a whole, and cannot be parsed part by part. For another example, SAX provides a mode for sequentially accessing a XML document. A series of events can be activated while the document is accessed, and a process function of a particular event can be called for handling the event. Thus, a document of any size can be parsed, and it may not be necessary to load the whole document.

In some embodiments, the bitmap pictures may be replaced with SVG to reduce resources consumed by pictures. In addition, attributes of SVG can be expanded. The attributes can be expanded as shown in any of the following exemplary embodiments.

First Embodiment: Adding a Scaling Attribute

Determining attribute data of each of graphic elements in a SVG document according to the instruction includes: according to a scaling instruction, in the instruction, for scaling a window, parsing a SVG document corresponding to the window to obtain parsed data, and determining a scaling value corresponding to a scaling attribute of each of the graphic elements in the SVG document, the scaling attribute being an previously added attribute of the graphic element.

In some embodiments, each of graphic elements in the SVG document can be expanded to include a scaling attribute, such as an attribute miui:scale-hint. The value of the scaling attribute can be equal to a value of the scaling ratio in the scaling instruction. For example, the value of the attribute can be set as equal to the scaling factor of an outer element. The value of the scaling attribute can be a preset value. That is, the value of the scaling attribute can be a preset value regardless of the scaling ratio of the element, the value of the scaling attribute may not change with the scaling instruction. The value of the scaling attribute can also be a product of the scaling ratio in the scaling instruction and a scaling factor.

When a scaling instruction for a window is received, a SVG document corresponding to the window can be parsed to obtain parsed data. The scaling value corresponding to the scaling attribute of each of graphic elements in the SVG document can be determined according to the parsed data and the scaling instruction. The scaling value can be a value equal to the scaling ratio in the scaling instruction, a preset value, or a product of the scaling ratio in the scaling instruction and a scaling factor.

After the scaling value corresponding to the scaling attribute of each of graphic elements is determined, the GUI corresponding to the graphic elements can be drawn according to the determined scaling values. During the drawing process, the graphic elements are drawn according to corresponding scaling values. The whole drawing process may include drawing multiple levels of the GUI. The scaling values may only influence the scaling attributes of the graphic elements, and the values of the scaling attributes of the graphic elements may be a final scaling ratio after the scaling is performed. Therefore, the GUI can be drawn according to the scaling value and other parsed drawing parameters. For example, a position and a size of a graphic element can be determined according to a product of a final scaling ratio and each of the other attribute values of the graphic element (for example, a position attribute value, a size attribute value, and the like). The other attributes may not be the position attribute and the size attribute. For example, for a rectangle, a position of the rectangle is determined by values of four attributes: x, y, width, and height; and for a circle, a position of the circle is determined by values of attributes: cx, cy, and r, i.e., coordinates of the center of the circle cx, cy, and a radius r of the circle.

In one embodiment, graphic elements in the SVG document can be scaled according to various scaling ratios through an expanded scaling attribute, so that distortions of images caused by scaling the SVG according to the single scaling factor in the scaling instruction can be avoided.

In one embodiment, after the SVG document corresponding to the window is parsed according to the scaling instruction for the window in the instruction, the method may further include: determining an aligning method corresponding to an aligning attribute of each of the graphic elements in the SVG document according to the parsed data obtained by parsing the SVG document and the scaling instruction, the aligning attribute being an previously expanded attribute of the graphic element.

In one embodiment, each of the graphic elements in the SVG document can be expanded to include an aligning attribute, such as an attribute miui:location. The value of the aligning attribute can be horizontally aligning, vertically aligning, and/or aligning relative to a designated interface element. The horizontally aligning can include always aligning or aligning to left side, always aligning or aligning to right side, or always aligning or aligning to the center. The vertically aligning can include always aligning or aligning to upper side, always aligning or aligning to the middle, or always aligning or aligning to bottom. Aligning relative to a designated interface element can be aligning to a father interface element (default value), aligning to a certain interface element which can be denoted with the identification of the element (#<id>). In addition, the aligning can be aligning to the whole SVG picture.

The aligning attribute can have all of the three kinds of values, spaced apart with a symbol "|". For example, if it is desired that the element is always at the leftmost or at the topmost of its father element, the attribute miui:location of the element can be set as: miui:location="left|:parent|top". And :parent can be omitted: miui:location="left|top". If it is desired that the element is aligned with a certain element, it can be: miui:location="center|#rect", so that the element is horizontally aligned at the center with an element with an identification of rect.

After a scaling value corresponding to a scaling attribute and an aligning method corresponding to an aligning attribute of each of graphic elements are determined, the GUI corresponding to the graphic elements can be drawn according to the determined scaling values and the aligning methods. For example, a final position and a size of each of graphic elements can be calculated according to the scaling value and the aligning method in combination with other attributes of the graphic element. As such, the GUI corresponding to the graphic elements can be drawn. During the drawing process, the graphic elements can be drawn according to respective scaling values and respective aligning methods. The whole drawing process includes drawing of multiple levels of the GUI. Scaling values and aligning methods can be expanded parameters in the drawing process. In the drawing process, the GUI can be drawn according to the scaling values, the aligning method, and other parsed drawing parameters.

As described, by expanding a scaling attribute, each of graphic elements in the SVG document can be scaled according to a distinct ratio. In addition, by expanding an aligning attribute, each of graphic elements in the SVG document can be aligned by a distinct aligning method.

Second Embodiment: Expanding a Dynamic Variable to Change a Style

Determining attribute data of each of graphic elements in a SVG document according to the instruction may include: parsing a SVG document according to a style changing instruction contained in the instruction to obtain parsed data, acquiring a target variable name of an attribute of each of graphic elements in the SVG document from the parsed data, determining a global comparison table according to the style changing instruction, the global comparison table recording, for one style, corresponding relationships between variable names and attribute values, and acquiring a target attribute value corresponding to the target variable value from the determined global comparison table.

In one embodiment, an attribute of any graphic element in a SVG document can be expanded to include a dynamic variable, and an original attribute value can be replaced with a dynamic variable name. For example, when a SVG document is generated, an original attribute value, which represents a style, of a graphic element can be replaced with a dynamic variable name. In this embodiment, a plurality of global comparison tables can also be stored in advance, and each of the global comparison tables may record corresponding relationships between names of variables and values of attributes under a style. When an instruction for changing a style is received, the SVG document can be parsed, and the original attribute values of the attributes of the graphic elements can be acquired according to the parsed result. If an original attributed value is a target variable name, a global comparison table can be determined according to the instruction for changing a style, and a target attribute value corresponding to the target variable name can be acquired from the determined global comparison table.

In addition, a format of a dynamic variable can be started with "$", the variable can be composed of letters (a-z, A-Z), digits (0-9) and an underline "_", and the largest number of characters can be limited to no more than 255. The dynamic variable may not need to be declared, nor to designate a data format. After a SVG picture is loaded in to the memory, the program can perform an instruction for changing a style at any time, to change the attribute value corresponding to the variable name. The type of the attribute value can be any type. If the attribute value of the variable is not a value acceptable by the SVG picture, the SVG picture can ignore the value.

After a target attribute value corresponding to a target variable name is determined, the GUI corresponding to the graphic elements can be drawn according to the determined target attribute value. The drawing process may require other drawing parameters from the parsed data, and the target attribute value may be only one of the drawing parameters.

As described, when an instruction for changing a style is received, a target variable name of an attribute of a graphic element in a SVG document can be acquired from parsed data. A global comparison table can be determined according to the instruction for changing a style. A target attribute value corresponding to the target variable name can be acquired from the determined global comparison table. The GUI corresponding to the graphic elements can be redrawn according to the target attribute value. Since a style can be changed without changing pictures, pictures of different styles are not required to be stored. Accordingly, storage resources can be saved, and drawing speeds can be improved.

Third Embodiment: Expanding an Attribute to Include a State Tracking Function Determining attribute data of each of graphic elements in a SVG document according to the instruction may include: according to a state switching instruction, in the instruction, for an interface element, parsing a SVG document corresponding to the interface element to obtain parsed data, the state switching instruction carrying an identification of a state and a state value of the state; deciding whether an attribute of each of graphic elements in the SVG document tracks the state according to the parsed data; and when the attribute is an attribute tracking the state, determining an attribute value of the attribute corresponding to the identification and the value of the state.

The state may not be an independent attribute, but rather, a modification or an appendix to the attribute. To expand an attribute to include a state tracking function, state tracking data can be correlated to the attribute. The correlation can be implemented by many ways, for example, by adding an address in data of the attribute which directs to the state tracking data. The state tracking data may include a corresponding relationship among an identification of the state (for example, a state Id), a state value, and an attribute value. The state id can be a digit or other symbol to distinguish different states. After an interface element issues an instruction for switching a state, as the instruction carries two parameters: a state Id and a state value, it can be determined which attributes of the graphic element track the state based on the parsed data and the identification of the state, and an attribute value of a corresponding attribute after switching to the state can be determined.

In one embodiment, an attribute of a graphic element in a SVG document can preset a state tracking function. An attribute with a state tracking feature can change its attribute value according to the state of the interface element. In switching a state, as the state value changes, the attribute value of the corresponding attribute tracking the state can change to an attribute value corresponding to the state value. For example, a background attribute of a button can be expanded to include a pressed-down state tracking function. Moreover, a corresponding table for the background attribute and the pressed-down state can be previously defined in a SVG document (for example, "pressed-down" corresponds to a red color, "not pressed-down" corresponds to a green color). When the button is pressed down by the user, the pressed-down state of the button is changed to "pressed-down." At this time, the background attribute value of the button can be changed to the "red color." In one embodiment, an attribute of a graphic element can be expanded to include a state tracking function in advance, and a corresponding relationship between the state Id of the interface element, state value, and attribute value of the attribute can be stored in advance. When an instruction for switching a state of an interface element is received, the SVG document corresponding to the interface element can be parsed, and whether the attributes of the graphic element track the state according to the parsed result can be determined. If an attribute tracks the state, the value of the attribute can be changed to an attribute value corresponding to the state, and subsequently the GUI corresponding to the graphic elements can be drawn according to the attribute value.

In some embodiments, when an instruction for switching a state of a graphic element is received, whether an attribute of the graphic element in the SVG document tracks the state can be determined. If an attribute tracks the state, an attribute value corresponding to the identification and the state value can be determined for the attribute, and the interface element can be drawn according to the attribute value. Thus, an attribute value can be modified according to different states without changing pictures. Since a picture change is not required in a state switch, storage of pictures corresponding to different states is not required. Accordingly, storage resources can be saved, and drawing speeds can be improved.

Fourth Embodiment: Adding a Position Graphic Element

Determining attribute data of each of graphic elements in a SVG document according to the instruction may include: parsing a SVG document according to a content drawing instruction contained in the instruction to obtain parsed data; acquiring each position graphic element from the parsed data, the position graphic element indicating a position of a content region.

Drawing the GUI according to the determined attribute data may include: determining position data indicated by each position graphic element as target position data of the content region; and drawing the content region according to the determined target position data and the content drawing instruction.

Figure 2:
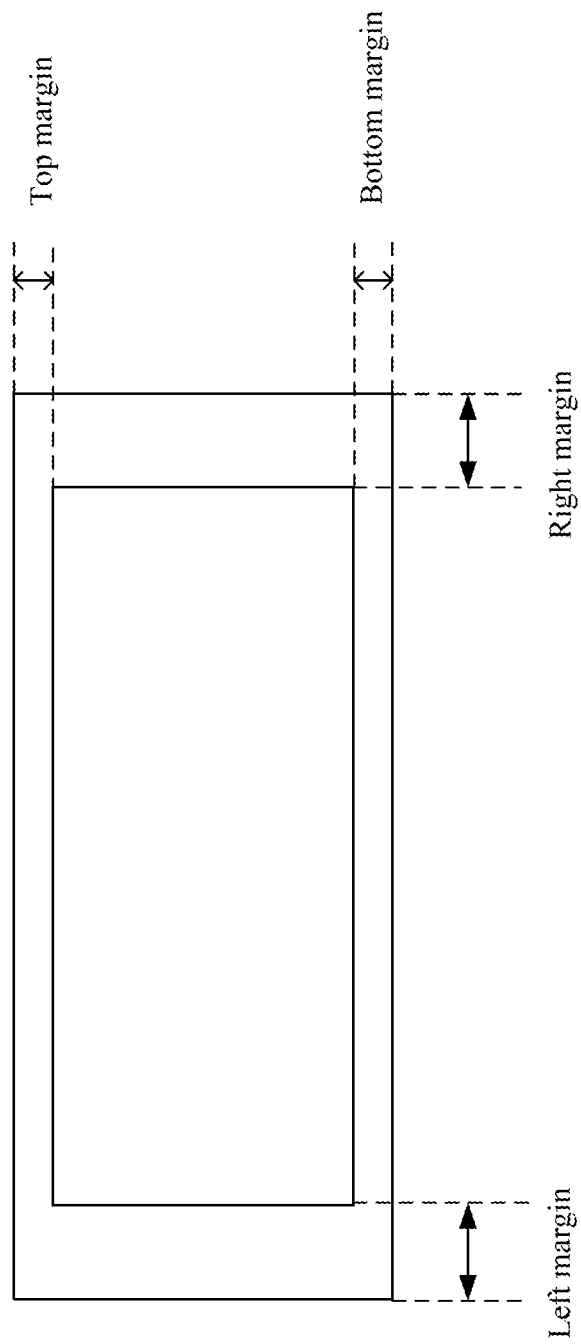
FIG. 2 is a schematic diagram illustrating a target position of a position graphic element, according to an exemplary embodiment of the present disclosure.

In this embodiment, a position graphic element can be expanded in a SVG, such as an element: miui::content. The position data of the position graphic element may be the position data of the content used for the calculation of the position of the content region, without being drawn. The position graphic element may represent a position where the content region is located. The position of the position graphic element can be defined by inherent SVG attributes such as x, y, width, and height, or can be defined by attributes such as miui:scale-hint and miui:location, or can be defined by an attribute miui:margin. When an attribute miui:margin is defined, the value of the attribute may replace the attribute value (x, y) to determine the position of the graphic element. The attribute miui:scale-hint can be involved in the calculation of a size and a position of a graphic element. The attribute miui:margin may indicate how much the margins are when the element is inside a parent element. FIG. 2 is a schematic diagram illustrating a target position of a position graphic element, according to an exemplary embodiment. Left margin represents a left margin of the position graphic element inside the parent element; right margin represents a right margin of the position graphic element inside the parent element; top margin represents a top margin of the position graphic element inside the parent element; and bottom margin represents a bottom margin of the position graphic element inside the parent element. In this case, miui:margin can be miui:margin="<left> <top> <right> <bottom>", such as miui:margin="10 20 10 20", or briefly miui:margin="10 20", representing left=right=10, top=bottom=20, or further briefly miui:margin="10", representing left=right=top=bottom.

As described, a position of a content region can be indicated by a position graphic element. Thus, a position of a content region can be determined to draw the content region according to an instruction for drawing a content and to improve the drawing efficiency.

The various embodiments described above can be combined in any manner, as long as they do not conflict to each other. Any combination of the above embodiments belongs to the scope of the present disclosure.

Corresponding to the above embodiments regarding a method for drawing a graphical user interface GUI, embodiments regarding a device for drawing a graphical user interface GUI and a terminal in which the device is applied are disclosed.

Figure 3:
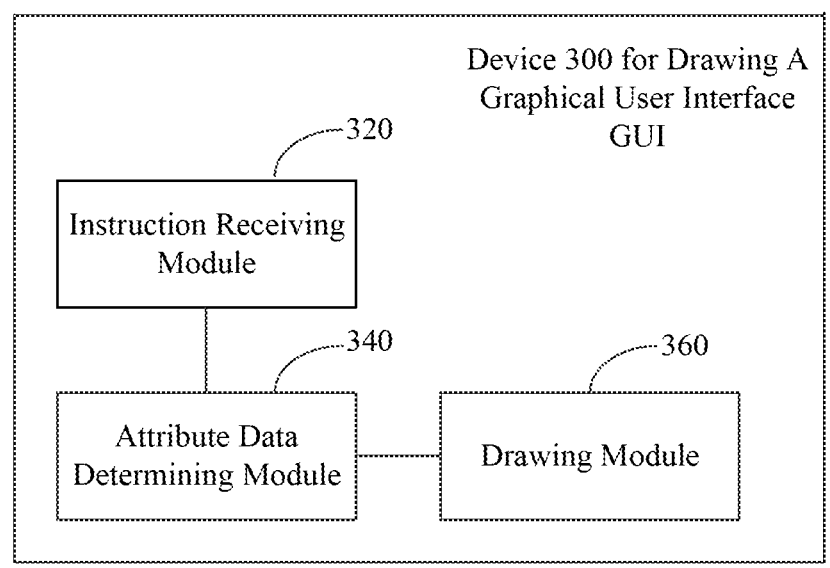
FIG. 3 is a block diagram illustrating a device for drawing a graphical user interface, according to an exemplary embodiment of the present disclosure.

FIG. 3 is a block diagram of a device 300 for drawing a graphical user interface, according to an exemplary embodiment of the present disclosure. The device may include: an instruction receiving module 320, an attribute data determining module 340, and a drawing module 360.

The instruction receiving module 320 may be configured to receive an instruction for drawing a GUI.

The attribute data determining module 340 may be configured to determine attribute data of each of graphic elements in a scalable vector graphic SVG document according to the received instruction, the graphic elements corresponding to the GUI.

The drawing module 360 may be configured to draw the GUI according to the determined attribute data.

In some embodiments, an instruction for drawing a GUI is received. Attribute data of each of graphic elements in a scalable vector graphic SVG document can be determined according to the received instruction, the graphic elements corresponding to the GUI. Then, the GUI can be drawn according to the determined attribute data. Thus, bitmap pictures can be replaced with SVG to reduce resources consumed by the pictures. In addition, since attribute data corresponding to a graphic element in a SVG document can be determined based on an instruction, the graphic element in the SVG document can be drawn to improve the drawing efficiency.

Figure 4:
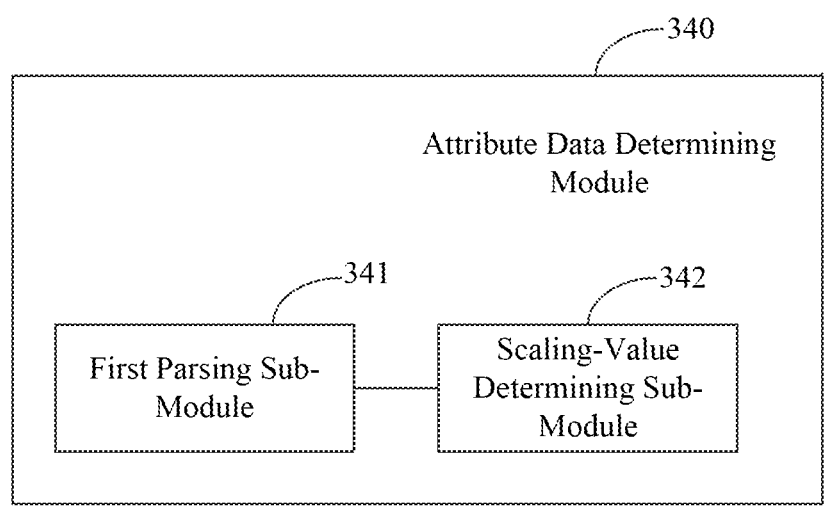
FIG. 4 is a block diagram illustrating a device for drawing a graphical user interface, according to an exemplary embodiment of the present disclosure.

FIG. 4 is a block diagram of the attribute data determining module 340 (FIG. 3), according to an exemplary embodiment of the present disclosure. Based on the embodiment shown with reference to FIG. 3, the attribute data determining module 340 may include: a first parsing sub-module 341 and a scaling-value determining sub-module 342.

The first parsing sub-module 341 may be configured to, according to a scaling instruction, in the instruction, for scaling a window, parse a SVG document corresponding to the window to obtain parsed data.

The scaling-value determining sub-module 342 may be configured to determine a scaling value corresponding to a scaling attribute of each of graphic elements in the SVG document, the scaling attribute being an previously expanded attribute of the graphic element.

As described, graphic elements in the SVG document can be scaled according to various scaling ratios through an expanded scaling attribute. Thus, distortion of images caused by scaling the SVG according to the single scaling factor in the scaling instruction can be avoided.

In one embodiment, the scaling value equals to a scaling ratio in the scaling instruction. In one embodiment, the scaling value is a preset value. In one embodiment, the scaling value is a product of a scaling ratio in the scaling instruction and a scaling factor.

Figure 5:
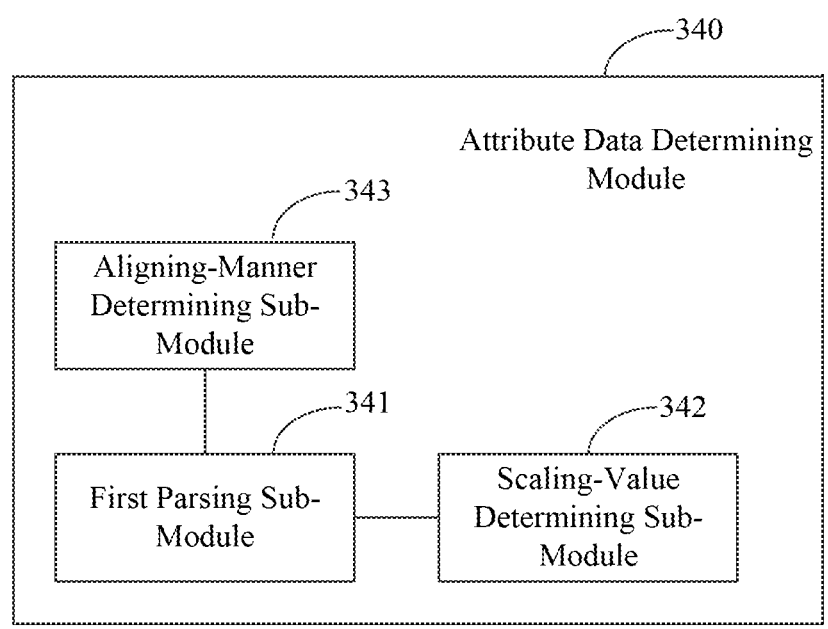
FIG. 5 is a block diagram illustrating an attribute data determining module, according to an exemplary embodiment of the present disclosure.

FIG. 5 is a block diagram of the attribute data determining module 340 (FIG. 4), according to an exemplary embodiment of the present disclosure. Based on the embodiment with reference to FIG. 4, the attribute data determining module 340 may further include an aligning-method determining sub-module 343.

The aligning-method determining sub-module 343 may be configured to determine an aligning method corresponding to an aligning attribute of each of graphic elements in the SVG document according to the parsed data obtained by parsing the SVG document and the scaling instruction, the aligning attribute being an previously expanded attribute of the graphic element As described, by expanding a scaling attribute, each of graphic elements in the SVG document can be scaled according to a distinct ratio. In addition to that, by expanding an aligning attribute, each of graphic elements in the SVG document can be aligned by a distinct aligning method.

The aligning method may include horizontally aligning, vertically aligning, and/or aligning relative to a designated interface element.

Figure 6:
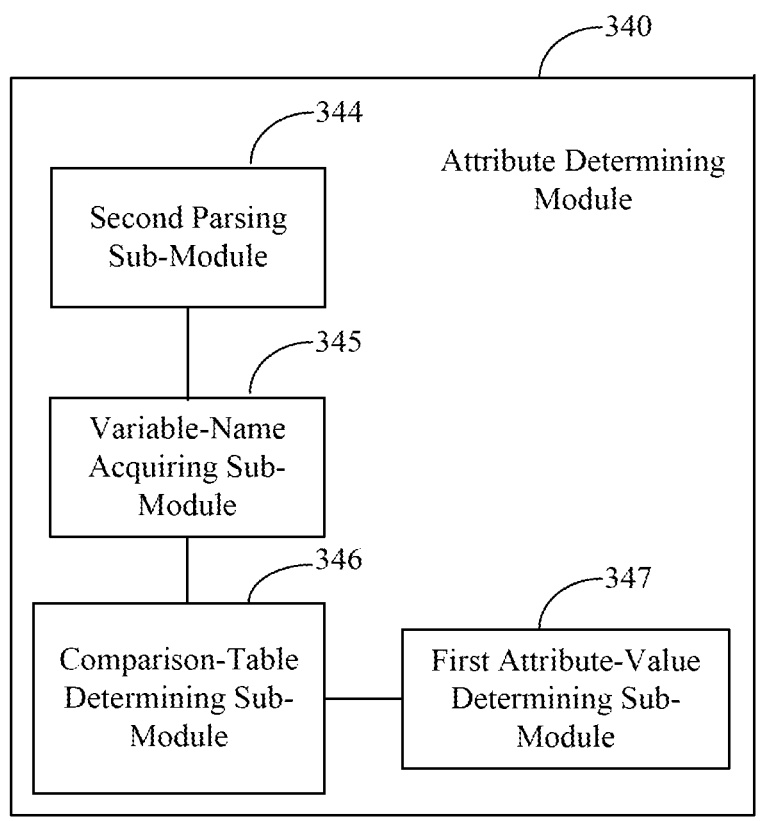
FIG. 6 is a block diagram illustrating an attribute data determining module, according to an exemplary embodiment of the present disclosure.

FIG. 6 is a block diagram of the attribute data determining module 340 (FIG. 3), according to an exemplary embodiment of the present disclosure. Based on the embodiment with reference to FIG. 3, in the present embodiment, the attribute data determining module 340 may also include: a second parsing sub-module 344, a variable-name acquiring sub-module 345, a comparison-table determining sub-module 346, and a first attribute-value determining sub-module 347.

The second parsing sub-module 344 may be configured to parse a SVG document according to a style changing instruction contained in the instruction to obtain parsed data.

The variable-name acquiring sub-module 345 may be configured to acquire a target variable name of an attribute of each of graphic elements in the SVG document from the parsed data.

The comparison-table determining sub-module 346 may be configured to determine a global comparison table according to the style changing instruction, the global comparison table recording corresponding relationships between variable names and attribute values for a style.

The first attribute-value determining sub-module 347 may be configured to acquire a target attribute value corresponding to the target variable value from the determined global comparison table.

As described, when an instruction for changing a style is received, a target variable name of an attribute of a graphic element is a SVG document can be acquired from parsed data; a global comparison table can be determined according to the instruction for changing a style; then a target attribute value corresponding to the target variable name can be acquired from the determined global comparison table; and the GUI corresponding to the graphic elements can be redrawn according to the target attribute value. Since a style can be changed without changing pictures, storage of pictures corresponding to different states is not required. Accordingly, storage resources can be saved, and drawing speeds can be improved.

Figure 7:
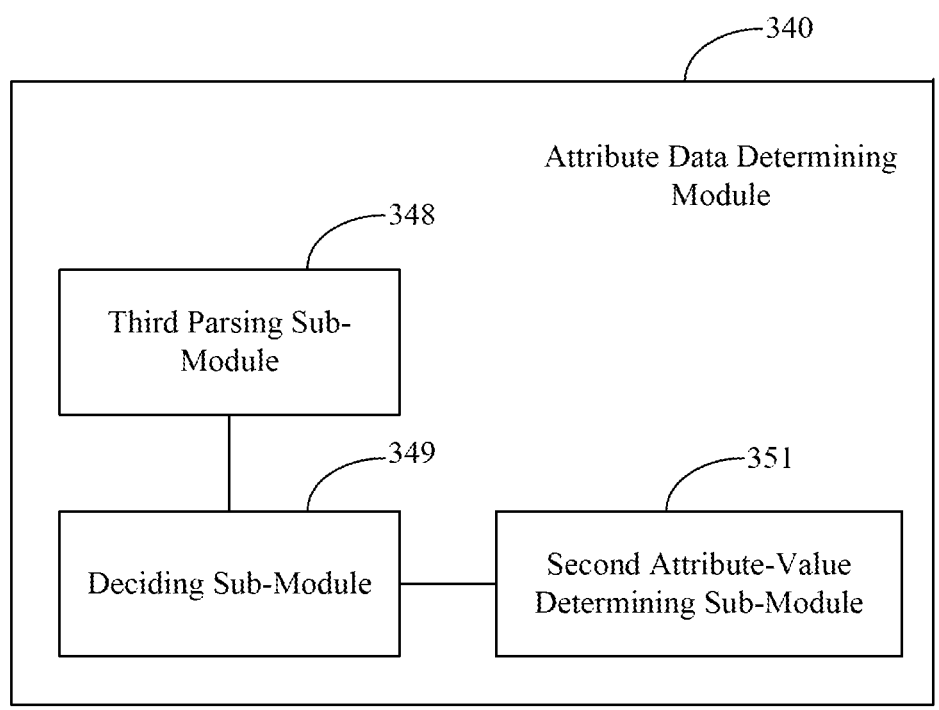
FIG. 7 is a block diagram illustrating an attribute data determining module, according to an exemplary embodiment of the present disclosure.

FIG. 7 is a block diagram of the attribute data determining module 340 (FIG. 3), according to an exemplary embodiment of the present disclosure. Based on the embodiment with reference to FIG. 3, the attribute data determining module 340 may further include: a third parsing sub-module 348, a deciding sub-module 349, and a second attribute-value determining sub-module 351.

The third parsing sub-module 348 may be configured to, according to a state switching instruction, in the instruction, for an interface element, parse a SVG document corresponding to the interface element to obtain parsed data, the state switching instruction carrying an identification of a state and a state value of the state.

The deciding sub-module 349 may be configured to determine whether an attribute of each of graphic elements in the SVG document tracks the state according to the parsed data.

The second attribute-value determining sub-module 351 may be configured to, when the attribute is an attribute tracking the state, determine an attribute value of the attribute corresponding to the identification and the value of the state.

As described, when an instruction for switching a state of a graphic element is received, whether an attribute of the graphic element in the SVG document tracks the state can be determined. If an attribute tracks the state, an attribute value corresponding to the identification and the state value can be determined for the attribute, and the interface element can be drawn according to the attribute value. Thus, an attribute value can be modified according to different states without changing pictures. Since a picture change is not required during a state switch, storage of pictures corresponding to different states may not be required. Accordingly, storage resources can be saved and drawing speeds can be improved.

Figure 8:
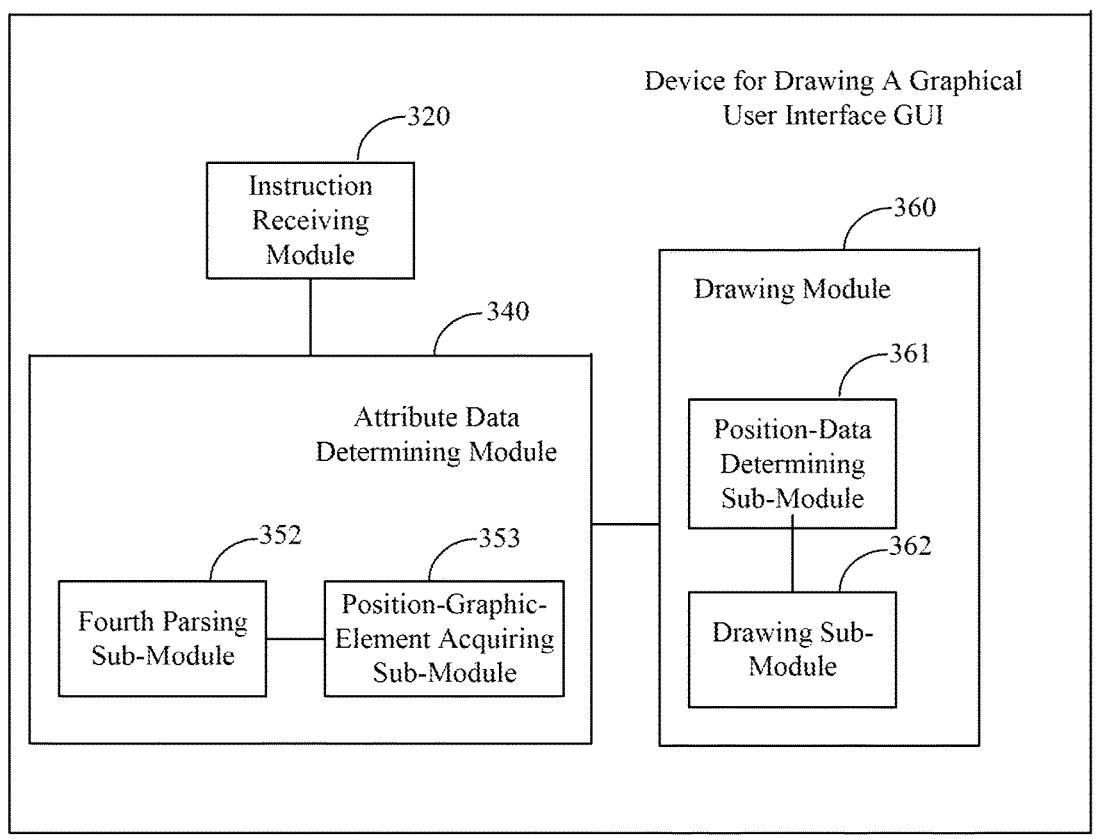
FIG. 8 is a block diagram illustrating a device for drawing a graphical user interface, according to an exemplary embodiment of the present disclosure.

FIG. 8 is a block diagram of another device for drawing a graphical user interface, according to an exemplary embodiment of the present disclosure. Based on the embodiment with reference to FIG. 3, the attribute data determining module 340 may include: a fourth parsing sub-module 352 and a position-graphic-element acquiring sub-module 353. The drawing module 360 may include: a position-data determining sub-module 361 and a drawing sub-module 362.

The fourth parsing sub-module 352 may be configured to parse a SVG document according to a content drawing instruction contained in the instruction to obtain parsed data.

The position-graphic-element acquiring sub-module 353 may be configured to acquire each position graphic element from the parsed data, the position graphic element indicating a position of a content region.

The position-data determining sub-module 361 may be configured to determine position data indicated by each position graphic element as target position data of the content region.

The drawing sub-module 362 may be configured to draw the content region according to the determined target position data and the content drawing instruction.

As described, a position of a content region can be indicated by a position graphic element. Thus, a position of a content region can be determined, to draw the content region according to an instruction for drawing a content and to improve the drawing efficiency.

For the device embodiments, since they correspond to the method embodiments, they can be referred to the related parts of the description of the method embodiments. The device embodiments described above are merely illustrative. The units described as separate may be or may not be physically separate, and the components illustrated as units may or may not be physical units, and may be at the same location, or may be distributed to multiple units over the network. One skilled in the art can understand and practice the embodiments without paying creative labor.

Figure 9:
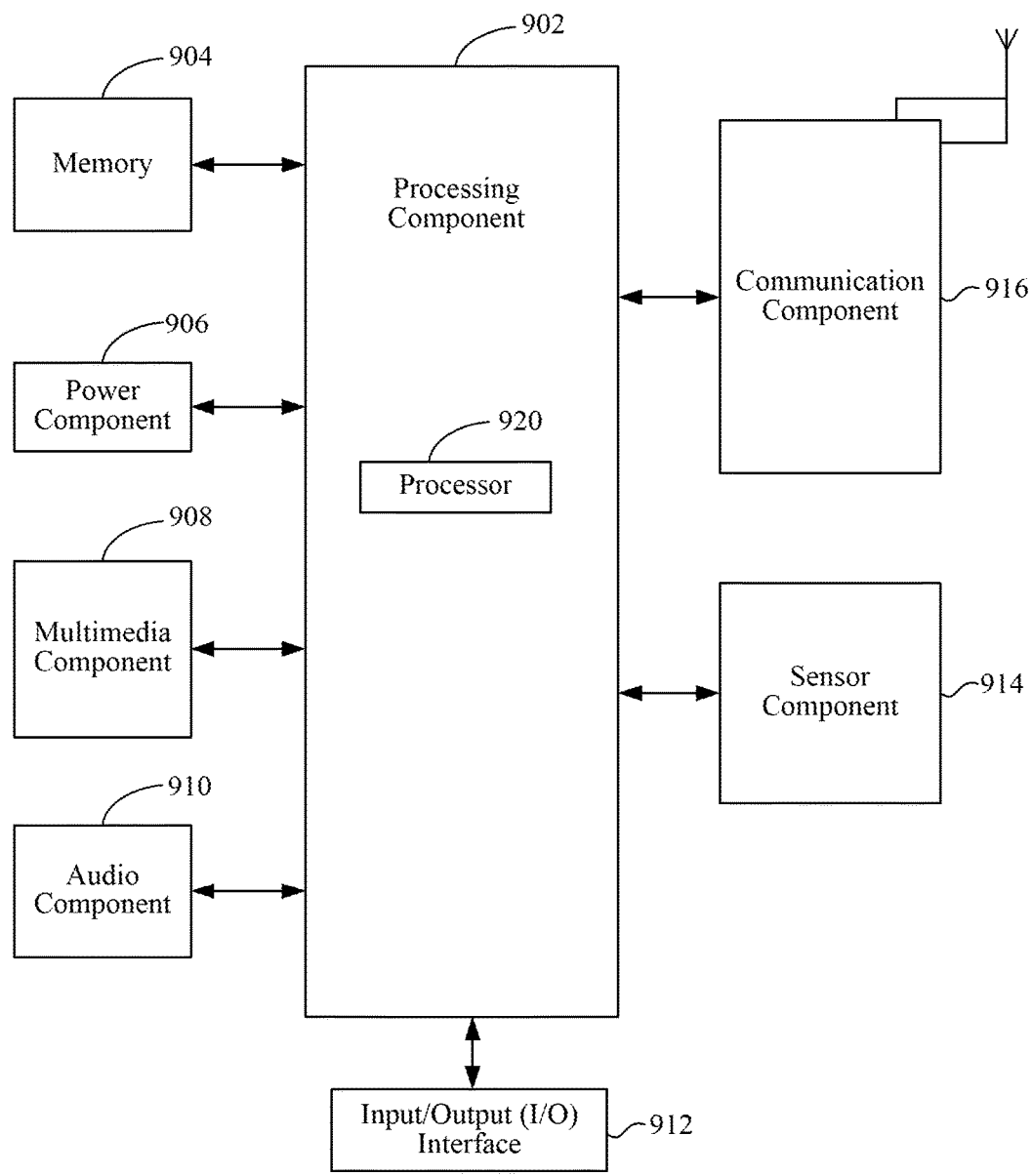
FIG. 9 is a block diagram illustrating a device for drawing a graphical user interface, according to an exemplary embodiment of the present disclosure.

FIG. 9 is a block diagram of a device 900 for drawing a graphical user interface GUI according to an exemplary embodiment. For example, the device 900 can be a mobile phone, a computer, a digital broadcast terminal, a messaging device, a gaming console, a tablet, a medical device, exercise equipment, a personal digital assistant, and the like.

Referring to FIG. 9, the device 900 can include one or more of the following components: a processing component 902, a memory 904, a power component 906, a multimedia component 908, an audio component 910, an input/output (I/O) interface 912, a sensor component 914, and a communication component 916.

The processing component 902 may control overall operations of the device 900, such as the operations associated with display, telephone calls, data communications, camera operations, and recording operations. The processing component 902 can include one or more processors 920 to execute instructions to perform all or part of the steps in the above described methods. Moreover, the processing component 902 can include one or more modules which facilitate the interaction between the processing component 902 and other components. For instance, the processing component 902 can include a multimedia module to facilitate the interaction between the multimedia component 908 and the processing component 902.

The memory 904 may be configured to store various types of data to support the operation of the device 900. Examples of such data include instructions for any applications or methods operated on the device 900, contact data, phonebook data, messages, pictures, video, etc. The memory 904 can be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 may provide power to various components of the device 900. The power component 906 can include a power management system, one or more power sources, and any other components associated with the generation, management, and distribution of power in the device 900.

The multimedia component 908 may include a screen providing an output interface between the device 900 and the user. In some embodiments, the screen can include a liquid crystal display (LCD) and a touch panel (TP). If the screen includes the touch panel, the screen can be implemented as a touch screen to receive input signals from the user. The touch panel may include one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 may include a front camera and/or a rear camera. The front camera and the rear camera can receive an external multimedia datum, while the device 900 is in an operation mode, such as a photographing mode or a video mode. Each of the front camera and the rear camera can be a fixed optical lens system or have focus and optical zoom capability.

The audio component 910 may be configured to output and/or input audio signals. For example, the audio component 910 may include a microphone ("MIC") configured to receive an external audio signal, when the device 900 is in an operation mode, such as a call mode, a recording mode, and a voice recognition mode. The received audio signal can be further stored in the memory 904 or transmitted via the communication component 916. In some embodiments, the audio component 910 may further include a speaker to output audio signals.

The I/O interface 912 may provide an interface between the processing component 902 and peripheral interface modules, such as a keyboard, a click wheel, buttons, and the like. The buttons can include, but are not limited to, a home button, a volume button, a starting button, and a locking button.

The sensor component 914 may include one or more sensors to provide status assessments of various aspects of the device 900. For instance, the sensor component 914 can detect an open/closed status of the device 900, relative positioning of components, e.g., the display and the keypad, of the device 900, a change in position of the device 900 or a component of the device 900, a presence or absence of user contact with the device 900, an orientation or an acceleration/deceleration of the device 900, and a change in temperature of the device 900. The sensor component 914 can include a proximity sensor configured to detect the presence of nearby objects without any physical contact. The sensor component 914 can also include a light sensor, such as a CMOS or CCD image sensor, for use in imaging applications. In some embodiments, the sensor component 914 can also include an accelerometer sensor, a gyroscope sensor, a magnetic sensor, a pressure sensor, a microwave sensor, or a temperature sensor.

The communication component 916 can be configured to facilitate communication, wired or wirelessly, between the device 900 and other devices. The device 900 can access a wireless network based on a communication standard, such as WiFi, 2G, or 3G, or a combination thereof. In one exemplary embodiment, the communication component 916 may receive a broadcast signal or broadcast associated information from an external broadcast management system via a broadcast channel. In one exemplary embodiment, the communication component 916 may further include a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In exemplary embodiments, the device 900 can be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as included in the memory 904, executable by the processor 920 in the device 900, for performing the above-described methods. For example, the non-transitory computer-readable storage medium can be a ROM, a RAM, a CD-ROM, a magnetic tape, a floppy disc, an optical data storage device, and the like.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

The above are exemplary embodiments of the present disclosure, which do not limit the present disclosure. Any modifications, equivalents and alterations within the spirit and idea of the present disclosure falls within the protective scope of present disclosure.

What is claimed is:

1. A method for drawing a graphical user interface (GUI), implemented by a terminal, comprising:
   receiving an instruction for drawing a GUI;
   determining attribute data of each of graphic elements in a scalable vector graphic (SVG) document according to the received instruction, the graphic elements corresponding to the GUI; and
   drawing the GUI according to the determined attribute data,
   wherein determining the attribute data of each of the graphic elements in the SVG document according to the received instruction comprises:
      parsing the SVG document according to a style changing instruction in the received instruction to obtain parsed data;
      acquiring a target variable name of an attribute of each of the graphic elements in the SVG document from the parsed data;
      determining a global comparison table according to the style changing instruction, the global comparison table recording corresponding relationships between variable names and attribute values for a style; and
      acquiring a target attribute value corresponding to the target variable value from the determined global comparison table.

2. The method of claim 1, wherein determining the attribute data of each of graphic elements in the SVG document according to the received instruction comprises:
   according to a scaling instruction for scaling a window, parsing the SVG document corresponding to the window to obtain parsed data; and
   determining a scaling value corresponding to a scaling attribute of each of the graphic elements in the SVG document according to the parsed data, the scaling attribute being an previously added attribute of the graphic elements.

3. The method of claim 2, wherein the scaling value is at least one of:
   a scaling ratio in the scaling instruction,
   a preset value, or
   a product of a scaling ratio in the scaling instruction and a scaling factor.

4. The method of claim 2, after parsing the SVG document corresponding to the window, further comprising:
   determining an aligning method corresponding to an aligning attribute of each of the graphic elements in the SVG document according to the parsed data, the aligning attribute being an previously added attribute of the graphic elements.

5. The method of claim 4, wherein the aligning method comprises at least one of horizontally aligning, vertically aligning, or aligning relative to a designated interface element.

6. A method for drawing a graphical user interface (GUI), implemented by a terminal, comprising:
   receiving an instruction for drawing a GUI;
   determining attribute data of each of graphic elements in a scalable vector graphic (SVG) document according to the received instruction, the graphic elements corresponding to the GUI; and
   drawing the GUI according to the determined attribute data, wherein determining the attribute data of each of the graphic elements in the SVG document according to the received instruction comprises:
  according to a state switching instruction, in the instruction, for an interface element, parsing the SVG document corresponding to the interface element to obtain parsed data, the state switching instruction carrying an identification of a state and a state value of the state;
  determining whether the attribute of each of the graphic elements in the SVG document tracks the state according to the parsed data; and
  if the attribute tracks the state, determining an attribute value of the attribute corresponding to the identification and the value of the state.

7. A method for drawing a graphical user interface (GUI), implemented by a terminal, comprising:
  receiving an instruction for drawing a GUI;
  determining attribute data of each of graphic elements in a scalable vector graphic (SVG) document according to the received instruction, the graphic elements corresponding to the GUI; and
  drawing the GUI according to the determined attribute data,
  wherein determining the attribute data of each of the graphic elements in the SVG document according to the received instruction comprises:
    parsing the SVG document according to a content drawing instruction in the instruction to obtain parsed data, and
    acquiring each position graphic element from the parsed data, the position graphic element indicating a position of a content region; and
  wherein drawing the GUI according to the determined attribute data comprises:
    determining position data indicated by each position graphic element as target position data of the content region, and
    drawing the content region according to the determined target position data and the content drawing instruction.

8. A device for drawing a graphical user interface (GUI), comprising:
  a processor; and
  a memory for storing instructions executable by the processor;
  wherein the processor is configured to perform:
  receiving an instruction for drawing a GUI;
  determining attribute data of each of graphic elements in a scalable vector graphic (SVG) document according to the received instruction, the graphic elements corresponding to the GUI; and
  drawing the GUI according to the determined attribute data,
  wherein in determining the attribute data of each of the graphic elements in the SVG document according to the received instruction, the processor is further configured to:
    parse the SVG document according to a style changing instruction in the received instruction to obtain parsed data;
    acquire a target variable name of an attribute of each of the graphic elements in the SVG document from the parsed data;
    determine a global comparison table according to the style changing instruction, the global comparison table recording corresponding relationships between variable names and attribute values for a style; and
    acquire a target attribute value corresponding to the target variable value from the determined global comparison table.

9. The device of claim 8, wherein determining the attribute data of each of the graphic elements in the SVG document according to the received instruction comprises:
  according to a scaling instruction, in the instruction, for scaling a window, parsing the SVG document corresponding to the window to obtain parsed data; and
  determining a scaling value corresponding to a scaling attribute of each of the graphic elements in the SVG document according to the parsed data, the scaling attribute being an previously expanded attribute of the graphic elements.

10. The device of claim 9, wherein the scaling value is at least one of:
  a scaling ratio in the scaling instruction;
  a preset value; or
  a product of a scaling ratio in the scaling instruction and a scaling factor.

11. The device of claim 9, after parsing the SVG document corresponding to the window, the processor is further configured to perform:
  determining an aligning method corresponding to an aligning attribute of each of the graphic elements in the SVG document according to the parsed data, the aligning attribute being an previously added attribute of the graphic elements.

12. The device of claim 11, wherein the aligning method comprises at least one of: horizontally aligning, vertically aligning, or aligning relative to a designated interface element.

13. A device for drawing a graphical user interface (GUI), comprising:
  a processor; and
  a memory for storing instructions executable by the processor;
  wherein the processor is configured to perform:
  receiving an instruction for drawing a GUI;
  determining attribute data of each of graphic elements in a scalable vector graphic (SVG) document according to the received instruction, the graphic elements corresponding to the GUI; and
  drawing the GUI according to the determined attribute data,
  wherein determining the attribute data of each of the graphic elements in the SVG document according to the received instruction comprises:
    according to a state switching instruction, in the instruction, for an interface element, parsing the SVG document corresponding to the interface element to obtain parsed data, the state switching instruction carrying an identification of a state and a state value of the state;
    determining whether the attribute of each of the graphic elements in the SVG document tracks the state according to the parsed data; and
    if the attribute tracks the state, determining an attribute value of the attribute corresponding to the identification and the value of the state.

14. A device for drawing a graphical user interface (GUI), comprising:
  a processor; and
  a memory for storing instructions executable by the processor;

wherein the processor is configured to perform:
receiving an instruction for drawing a GUI;
determining attribute data of each of graphic elements in a scalable vector graphic (SVG) document according to the received instruction, the graphic elements corresponding to the GUI; and
drawing the GUI according to the determined attribute data,
wherein determining the attribute data of each of the graphic elements in the SVG document according to the received instruction comprises:
parsing the SVG document according to a content drawing instruction in the instruction to obtain parsed data, and
acquiring each position graphic element from the parsed data, the position graphic element indicating a position of a content region; and
wherein drawing the GUI according to the determined attribute data comprises:
determining position data indicated by each position graphic element as target position data of the content region, and
drawing the content region according to the determined target position data and the content drawing instruction.

15. A non-transitory computer-readable storage medium having stored instructions that, when executed by a processor of a terminal, cause the terminal to perform a method for drawing a graphical user interface (GUI), the method comprising:
receiving an instruction for drawing a GUI;
determining attribute data of each of graphic elements in a scalable vector graphic (SVG) document according to the received instruction, the graphic elements corresponding to the GUI; and
drawing the GUI according to the determined attribute data,
wherein determining the attribute data of each of the graphic elements in the SVG document according to the received instruction comprises:
parsing the SVG document according to a style changing instruction in the received instruction to obtain parsed data;
acquiring a target variable name of an attribute of each of the graphic elements in the SVG document from the parsed data;
determining a global comparison table according to the style changing instruction, the global comparison table recording corresponding relationships between variable names and attribute values for a style; and
acquiring a target attribute value corresponding to the target variable value from the determined global comparison table.

16. The non-transitory computer-readable storage medium of claim 15, wherein determining the attribute data of each of the graphic elements in the SVG document according to the instruction comprises:

according to a scaling instruction, in the instruction, for scaling a window, parsing the SVG document corresponding to the window to obtain parsed data; and
determining a scaling value corresponding to a scaling attribute of each of the graphic elements in the SVG document, the scaling attribute being an previously added attribute of the graphic elements.

17. The non-transitory computer-readable storage medium of claim 16, wherein after parsing the SVG document corresponding to the window, the method further comprises:
determining an aligning method corresponding to an aligning attribute of each of the graphic elements in the SVG document according to the parsed data, the aligning attribute being an previously added attribute of the graphic element.

18. The non-transitory computer-readable storage medium of claim 16, wherein the scaling value is at least one of:
a scaling ratio in the scaling instruction,
a preset value, or
a product of a scaling ratio in the scaling instruction and a scaling factor.

19. The non-transitory computer-readable storage medium of claim 15, wherein determining the attribute data of each of the graphic elements in the SVG document according to the received instruction comprises:
according to a state switching instruction, in the instruction, for an interface element, parsing the SVG document corresponding to the interface element to obtain parsed data, the state switching instruction carrying an identification of a state and a state value of the state;
determining whether the attribute of each of the graphic elements in the SVG document tracks the state according to the parsed data; and
if the attribute tracks the state, determining an attribute value of the attribute corresponding to the identification and the value of the state.

20. The non-transitory computer-readable storage medium of claim 15, wherein determining the attribute data of each of the graphic elements in the SVG document according to the received instruction comprises:
parsing the SVG document according to a content drawing instruction in the instruction to obtain parsed data,
acquiring each position graphic element from the parsed data, the position graphic element indicating a position of a content region; and
drawing the GUI according to the determined attribute data comprises:
determining position data indicated by each position graphic element as target position data of the content region, and
drawing the content region according to the determined target position data and the content drawing instruction.

* * * * *